United States Patent
de la Cropte de Chanterac et al.

(10) Patent No.: US 9,489,031 B2
(45) Date of Patent: Nov. 8, 2016

(54) METHOD TO REDUCE ACOUSTIC NOISE INDUCED BY PROCESSOR PERFORMANCE STATE CHANGES IN RESPONSE TO PERIODIC APPLICATION WORKLOADS

(71) Applicant: Apple Inc., Cupertino, CA (US)

(72) Inventors: Cyril de la Cropte de Chanterac, San Francisco, CA (US); Kieran Poulain, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 14/202,272

(22) Filed: Mar. 10, 2014

(65) Prior Publication Data
US 2015/0253826 A1    Sep. 10, 2015

(51) Int. Cl.
*G06F 1/32*    (2006.01)
*G06F 1/26*    (2006.01)

(52) U.S. Cl.
CPC ............ *G06F 1/3228* (2013.01); *G06F 1/324* (2013.01); *G06F 1/329* (2013.01); *G06F 1/3296* (2013.01); *G06F 1/26* (2013.01); *Y02B 60/1217* (2013.01); *Y02B 60/1285* (2013.01); *Y02B 60/144* (2013.01)

(58) Field of Classification Search
CPC .................................................. G06F 1/3228
USPC ........................................................ 713/320
See application file for complete search history.

(56) References Cited

U.S. PATENT DOCUMENTS

| | | | |
|---|---|---|---|
| 7,472,289 B2 | 12/2008 | Rodriguez et al. | |
| 7,747,878 B2 | 6/2010 | Vyssotski et al. | |
| 2003/0217093 A1* | 11/2003 | Dailey | G06F 9/4887 718/107 |
| 2006/0103639 A1 | 5/2006 | Ichiraku | |
| 2006/0136370 A1* | 6/2006 | Buckler | G06F 11/3452 |
| 2008/0177424 A1* | 7/2008 | Wheeler | G06F 1/3203 700/295 |
| 2010/0115343 A1* | 5/2010 | Floyd | G06F 1/3203 714/39 |
| 2010/0191936 A1* | 7/2010 | Khatri | G06F 1/3203 712/42 |
| 2010/0299545 A1* | 11/2010 | Lyu | G06F 1/3203 713/322 |
| 2013/0346764 A1* | 12/2013 | Gullbrand | H02M 1/36 713/300 |
| 2014/0012987 A1* | 1/2014 | Jung | G06F 9/5083 709/226 |
| 2014/0101420 A1* | 4/2014 | Wu | G06F 1/3206 713/1 |
| 2015/0026699 A1* | 1/2015 | Nakamura | G06F 11/30 718/106 |
| 2015/0134982 A1* | 5/2015 | Park | G06F 1/3296 713/300 |

* cited by examiner

*Primary Examiner* — Thomas Lee
*Assistant Examiner* — Volvick Derose
(74) *Attorney, Agent, or Firm* — Meyertons, Hood, Kivlin, Kowert & Goetzel, P.C.; Erik A. Heter (57) ABSTRACT

A method and apparatus to alter acoustic noise induced by processor performance changes is disclosed. In one embodiment, a processor having one or more processor cores may execute instructions of one or more applications. The performance level (e.g., supply voltage and/or clock frequency) may be adjusted in accordance with workload demands. One or more of the applications executing on a core of the processor may exhibit periodic behavior, thereby causing periodic changes (e.g., increases) in the performance level. Performance monitoring may be conducted and may detect the periodic changes in the workload of the application. Responsive to the detection of the periodic changes, a power management unit may subsequently cause future performance level changes associated with the application to occur aperiodically.

16 Claims, 8 Drawing Sheets

METHOD TO REDUCE ACOUSTIC NOISE INDUCED BY PROCESSOR PERFORMANCE STATE CHANGES IN RESPONSE TO PERIODIC APPLICATION WORKLOADS

BACKGROUND

1. Technical Field

This disclosure relates to electronic systems, and more particularly, to systems having the capability to adjust performance of processing circuitry based on workloads.

2. Description of the Related Art

Modern computer systems (including portable devices, such as smart phones) are often times configured to adjust processor performance parameters based on application workloads. For example, for higher workloads, one or both of a processor (or processor core, system, etc.) supply voltage and clock frequency may be increased. This may enable the processor/processor core to more quickly complete the current task. Thereafter, if performance demands decrease, the supply voltage and/or clock frequency may be reduced. In general, power management circuitry (or software) may cause performance level increases or decreases as desired and in accordance with application workloads. Moreover, in some cases, the performance level at any given time may be driven by particular applications executing on the computer system, and thus performance levels may be boosted or reduced based on the demands of that application.

SUMMARY OF THE DISCLOSURE

A method and apparatus to alter acoustic noise induced by processor performance changes is disclosed. In one embodiment, a processor having one or more processor cores may execute instructions of one or more applications. The performance level (e.g., supply voltage and/or clock frequency) may be adjusted in accordance with workload demands. One or more of the applications executing on a core of the processor may exhibit periodic behavior, thereby causing periodic changes (e.g., increases) in the performance level. Performance monitoring may be conducted and may detect the periodic changes in the workload of the application. Responsive to the detection of the periodic changes, a power management unit may subsequently cause future performance level changes associated with the application to occur aperiodically.

In one embodiment, a processor includes one or more processor cores configured to execute instructions of one or more applications. The processor cores may be implemented on an integrated circuit (IC) that is attached to a printed circuit board (PCB) or other suitable carrier. When the processor core is undergoing periodic performance level increases, acoustic noise may be introduced on a printed circuit board (PCB) and/or within system packaging. By causing the performance levels to be changed aperiodically, the amount of acoustic noise may be significantly altered relative to that generated when performance level increases occur periodically.

The system may include a power management unit, a performance monitor, and a random delay generator. The performance controller may monitor the performance levels of the processor (or of the various cores of a multi-core processor) to determine whether performance level changes are occurring periodically. The random delay generator may randomly generate delay values. Responsive to detecting that performance changes are occurring periodically, the power management unit may delay a next performance change by an amount of time according to a randomly generated delay value. Random delays may be applied to subsequent changes in the performance level such that they occur aperiodically.

In various embodiments, the performance controller may determine which application, processor, thread, or other group of instructions is causing the periodic changes to the performance level. Upon detecting the occurrence of periodic performance level changes, the power management unit may begin causing the performance level changes resulting from the group of instructions to occur aperiodically until that group is no longer active. For example, if a particular application is determined by the performance controller to be causing periodic increases in the performance level, the power management unit may begin causing the performance level increases to occur aperiodically and continue doing so until the application has been terminated or otherwise discontinues execution.

BRIEF DESCRIPTION OF THE DRAWINGS

Other aspects of the disclosure will become apparent upon reading the following detailed description and upon reference to the accompanying drawings which are now described as follows.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

Figure 1:
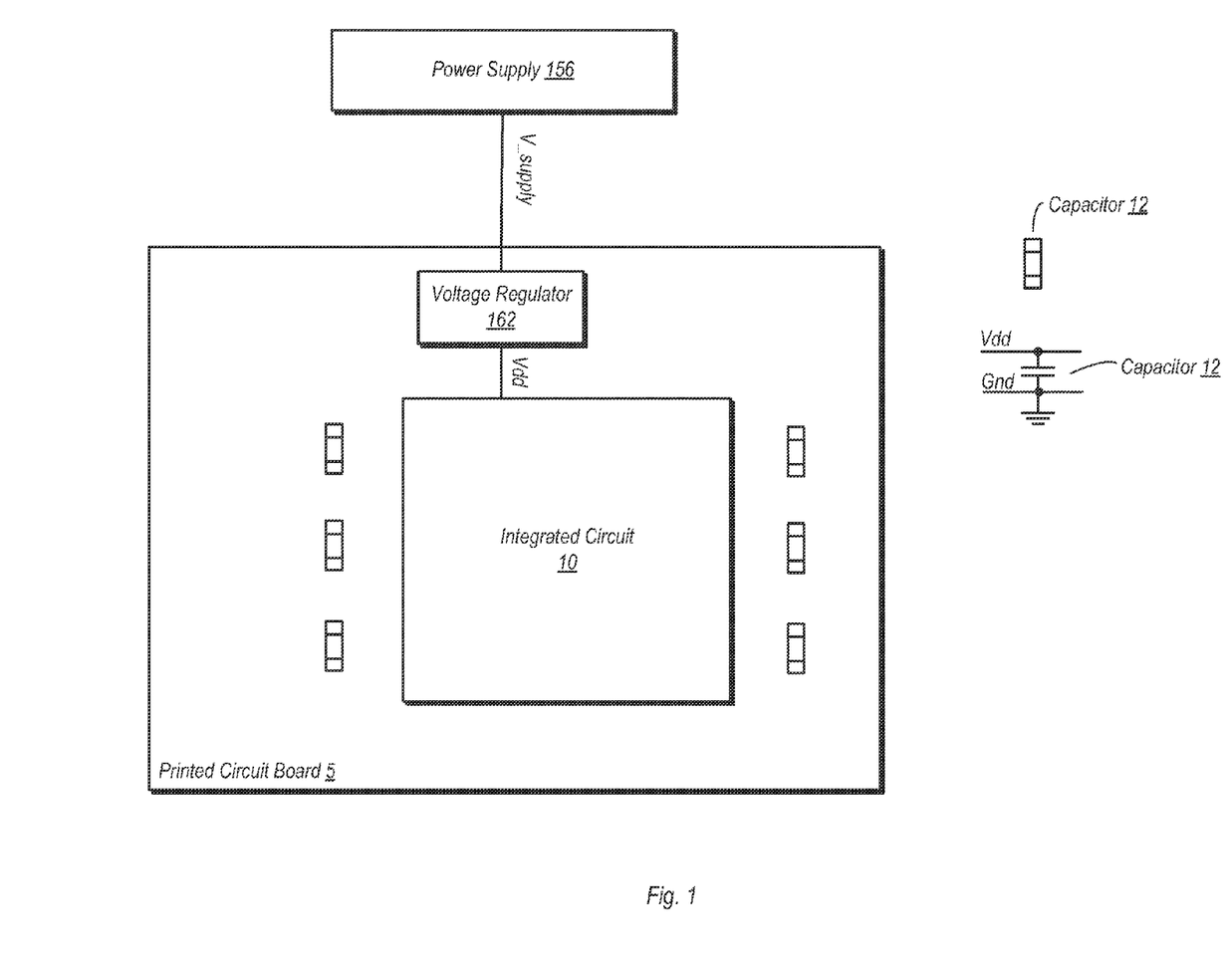
FIG. 1 is a block diagram illustrating a portion of one embodiment of a system including an integrated circuit (IC) mounted on a printed circuit board (PCB).

FIG. 1 is a block diagram illustrating a portion of one embodiment of a system including an integrated circuit (IC) mounted on a printed circuit board (PCB). In the embodiment shown, IC 10 is mounted upon PCB 5. Additionally, a number of decoupling capacitors 12 are also mounted on PCB 5, as is a voltage regulator 162. A power supply 156 is coupled to provide a supply voltage, V supply, to voltage regulator 162. In turn, voltage regulator 162 provides a regulated voltage, Vdd, to IC 10. Decoupling capacitors 12 in the embodiment shown are coupled between the voltage node Vdd and a ground voltage node. These capacitors provide decoupling between Vdd and ground while shunting power supply noise to ground. Decoupling capacitors 12 may charge and discharge according to changing current demands by circuitry implemented on IC 10. For example, changing performance levels on IC 10 may cause a change to the current demanded therefrom. As will be discussed below, this can in some cases result in the generation of acoustic noise. The general concepts outlined thereafter apply to circuits integrating capacitors and/or inductors that mechanically deform under the influence of electrical parameters IC 10 in the embodiment shown may be one of a number of different types of integrated circuits. For example, IC 10 may be a system-on-a-chip (SoC) having one or more processor cores, as well as other functional units (e.g., graphics units, etc.). Generally speaking, IC 10 may include one or more functional units implemented thereon that are subject to performance level changes due to various performance demands. For example, in an embodiment where IC 10 includes one or more processor cores, the performance level of each processor core may be adjusted based on workload demands. Adjusting the performance level as defined herein may include changing an operating voltage, changing a clock frequency, or both. For example, if the workload on a particular processor core increases, the operating voltage and/or the frequency of a clock signal provided thereto may be increased.

A workload, or processing workload, may be defined as a number of scheduled instructions or other activity by one or more applications executing in the processor. For example, a particular application may schedule (or cause the scheduling of, via an operating system) a number of instructions to be executed by the processor, after some time of inactivity. This may constitute an increase in the workload for that application. The number of scheduled instructions for an active application at a given time may constitute its instantaneous workload, while the number of scheduled instructions for all applications at a given time may constitute an aggregate workload for the processor. Some applications may exhibit periodic behavior in their workloads. That is, such application may schedule groups of instructions to execute on a periodic basis. As is discussed below, this may result in a periodically increased workload demands on the processor and corresponding periodic performance level increases.

Increasing the performance level of the processor may cause a corresponding increase in current consumption. The increased current consumption may initially cause the decoupling capacitors 12 to discharge some current before eventually recharging. In general, increases and decreases in the performance level of circuitry on IC 10 may cause corresponding discharging and charging of the decoupling capacitors 12. In some cases, if the performance level changes occur periodically, the resulting periodic charging and discharging of decoupling capacitors 12 can result in the undesirable generation of acoustic noise. However, the various method and apparatus embodiments discussed herein may be arranged to detect the presence of workload demand changes (periodic increases or periodic decreases) that cause corresponding changes to the performance levels and subsequently cause the performance level increases to occur aperiodically. This in turn may alter the level of undesirable acoustic noise by modifying its signature and potentially decreasing the resulting tonality.

Figure 2:
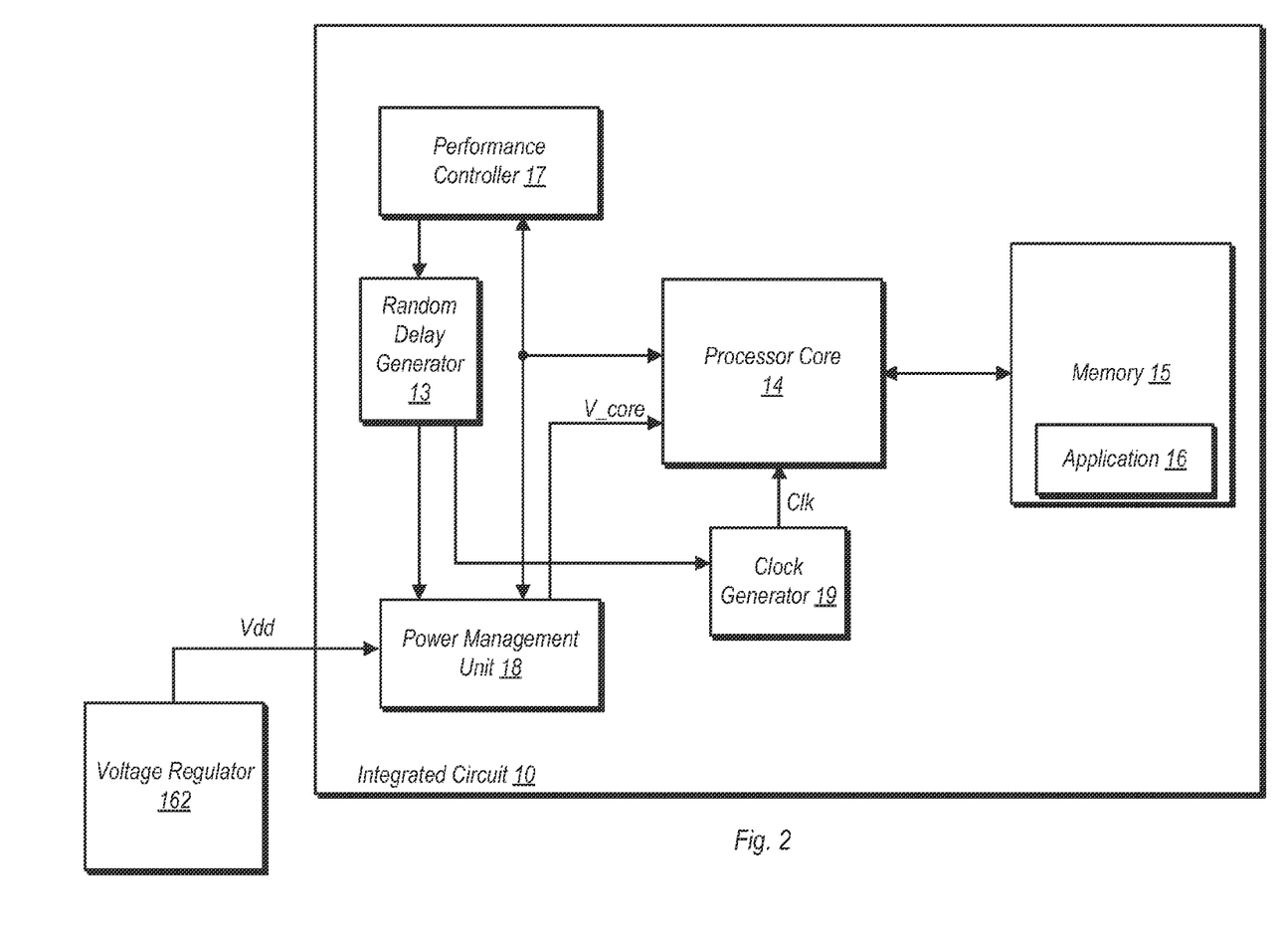
FIG. 2 is a block diagram illustrating one embodiment of an IC.

FIG. 2 further illustrates one embodiment of IC 10. It is noted the embodiment of IC 10 is exemplary, and is not intended to limit the type or arrangement of an IC (and operation thereof) that may fall within the scope of this disclosure. It is further noted that certain functional units discussed in reference to FIG. 2 (e.g., performance controller 17) may be implemented in hardware, software, or firmware. Thus, while blocks such as performance controller 17 are discussed herein as if they are implemented as circuitry on IC 10, embodiments are possible and contemplated wherein the functions carried out by these blocks may be carried out partly or entirely in software.

IC 10 in the embodiment shown is implemented as a processor, and thus includes at least one processor core 14 (additional instances of the same may be included, although only one is shown here for the sake of simplicity). Processor core 14 may include one more execution units, and may be configured to execute instructions and perform various information processing functions. IC 10 includes a memory 15 (e.g., a random access memory, or RAM) that is configured to provide storage for instructions and data that are accessed by processor core 14 in performing useful work. Results of work performed by processor core 14 may also be stored in memory 15. In this particular illustration, memory 15 is storing instructions of an application 15, which may be any type of software program to be executed on processor core 14. For example, if IC 10 is a chip implemented in a mobile device (e.g., smart phone, tablet computer, etc.), application 16 may be a text messaging program, a video player, or virtually any other type of program that can be used on such a device. In general, application 16 may be any type of program, and may comprise a number of instructions as well as data. In some cases, the execution of instructions of application 16 may cause periodic changes in the performance level of processor core 14 (e.g., periodic increases). Although only one instance of an application 16 is shown here, it is to be understood that multiple instances may be stored in memory at any given time. It is also noted that additional memories (e.g., non-volatile storage) may also be included on IC 10 or may otherwise be coupled thereto.

Power management unit 18 in the embodiment shown is coupled to processor core 14. Among the functions of power management unit 18 is to control the performance level of processor core 14. In particular, power management unit 18 may control the processor core operating voltage (V_core).

In this particular embodiment, the frequency of the clock signal (Clk) provided to processor core 14 may be controlled by performance controller 17 via random delay generator 13. The clock signal may be generated by clock generator 19, which may be a phase locked loop (PLL) or other suitable clock generation circuitry. It is noted that in other embodiments, the power management unit may control the frequency of the clock signal provided to processor core 14.

For increased processing workloads, power management unit 18 may increase the operating voltage while performance controller 17 may cause (through random delay generator 13) an increase the clock frequency to enable processor core 14 to more quickly complete its current task. It is noted that a performance level increase may be defined as increasing one or both of the processor operating voltage and clock frequency. After the workload has subsided, power management unit 18 may reduce the operating reducing the operating voltage while performance controller 17 may cause a reduction in the clock frequency. In some cases, when processor core 14 is idle (i.e. not performing any useful work), performance controller 17 may inhibit the clock signal and/or power management unit 18 may turn off the operating voltage.

Performance controller 17 may be configured to monitor performance levels of processor core 14, as well as monitoring application workloads. Among the functions performed by performance controller 17 may be the tracking of changes (e.g., increases) in a processing workload of an application or applications executing on processor core 14. In the embodiment shown, performance controller 17 is configured to interface with power management unit 18 and processor core 14. In tracking the changes to a processing workload of an application executing on processor core 14, performance controller 17 may record a time stamp for each time the processing workload changes (e.g., increases). For example, performance controller 17 may record a time stamp indicative of the time of occurrence for each processing workload increase of an application executing on processor core 14. Performance level changes may also be tracked. In one embodiment, tracking performance level changes may be used to verify that a particular application executing on processor core 14 is causing the changes.

Performance controller 17 may track the changing workloads of an application (or other type of instruction group) in various ways. In one embodiment, performance controller may receive information from a scheduler, from operating system (OS) software, or other source, of scheduled processing tasks. More particularly, performance controller 17 may determine each instance at which a group of instructions associated with a given application are scheduled to execute. Some applications that render user interface effects may be particularly prone to periodic workload increases, and performance controller 17 may also receive indications (e.g., from the OS or the application itself) when these applications are running. In general, any suitable mechanism for tracking processing workloads associated with particular applications may be utilized by performance controller. These mechanisms will be apparent to those skilled in the art.

After recording a time stamp for a processing workload change, performance controller 17 may compute a delta, or time difference, with the most recent previous processing workload change of the same type. For example, if performance controller 17 is tracking processing workload increases, a time difference (delta) may be calculated between the most recently recorded workload increase and the most recent pervious occurrence of a workload increase. A certain number of these time differences may be recorded and maintained by performance controller 17 for further analysis (e.g., the most recent 100 instances). A high occurrence of a certain delta (or range thereof) may indicate periodic behavior. That is, the high occurrence of a certain delta may indicate that an application (or threads or other group of instructions) is periodically increasing its workload thereby leading to periodic increases in the performance level of processor core 14. In response to detecting periodic increases in the processing workloads, performance controller 17 may generate indications that cause resulting performance level increases subsequent to the detection to occur aperiodically.

In this embodiment, IC 10 is configured to cause aperiodic changes in the performance level of processor core 14 using random delay generator 13. Random delay generator 13 may generate random delay values, which are provided as control information to power management unit 18 and clock generator 19. Power management unit 18 may then delay a next voltage level increase by the randomly generated delay value. Similarly, a clock frequency increase by clock generator 19 may also be delayed. Furthermore, random delay generator 13 may continue to randomly generate and provide delay values to power management unit 18 and clock generator 19. Each time power management unit 18 is to increase the voltage level, it may delay the increase by a newly generated delay value received from random delay generator 13. Since the clock frequency increases may be performed in conjunction with the voltage level increases (and as part of the overall performance level increase), clock generator 19 may similarly delay the former to coincide with the latter. In this manner, the increases in performance level will become aperiodic, even if the increasing workload demands remain periodic. The amount of delay applied, while random, may be limited to a range so any adverse effects on overall system performance are minor if not negligible.

It is noted that in some embodiments, random delay generator 13 may generate positive and negative delays. For example, random delay generator 13 in one embodiment may be configured to generate delays between −3 and +3 milliseconds. In general, random delay generator 13 may be arranged to generate delays in any suitable manner. It is further noted that while the embodiment discussed above increases performance by increasing both the operating voltage and clock frequency, embodiments are possible and contemplate wherein these two parameters may be controlled separately from one another.

Figure 3:
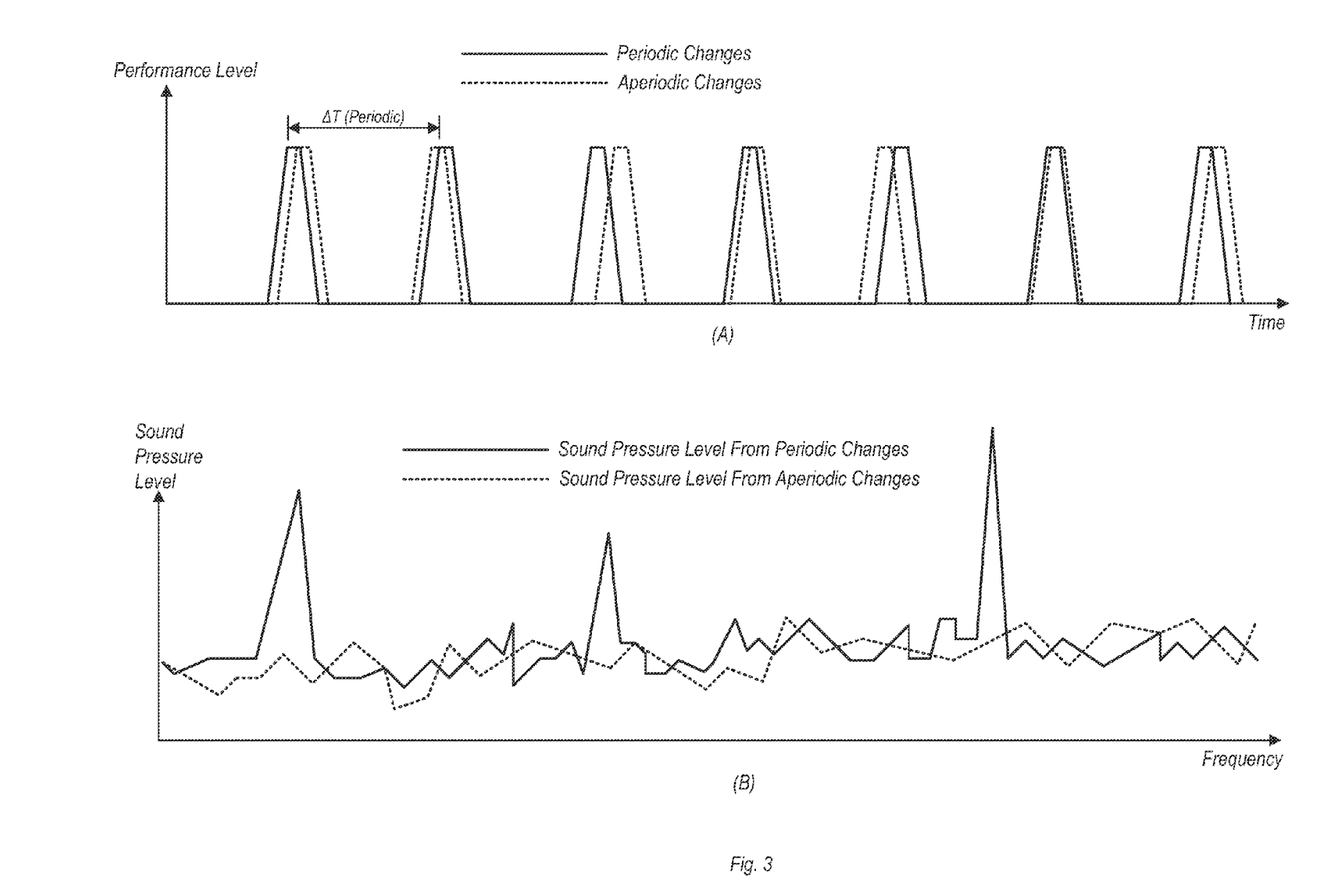
FIG. 3 includes diagrams illustrating, in both the time and frequency domains, operation of one embodiment of an IC undergoing periodic performance increases as well as the effects of causing the performance increases to occur aperiodically.

FIG. 3 includes diagrams illustrating, in both the time and frequency domains, operation of one embodiment of an IC undergoing periodic performance increases as well as the effects of causing the performance increases to occur aperiodically. The first figure, (A), illustrates performance levels vs. time, with the solid line representing periodic changes and the dashed line representing aperiodic changes. The performance level increases shown here may be driven by a single application, thread, etc. that is exhibiting periodic behavior. It can be seen in this example that the resulting performance levels are periodically increasing for a short time before returning to a lower level. The difference in time is indicated by ΔT, which is the period for the periodic increases (and which, correspond to the periodic increases in processing workload).

As noted above, performance level changes may result in the discharging and charging of decoupling capacitors and other capacitances existing between voltage nodes and a ground node. On the PCB, this periodic cycle of discharging and charging can result in mechanical stresses that may produce acoustic noise in the audible range. A possible result of the periodic increases in performance level is shown in (B), which is a spectrum of acoustic noise level [dB] vs. frequency [Hz]. As can be seen, there are three major peaks occurring. The higher frequency peaks may be harmonic multiples of the lower frequency peak. The noise indicated by these peaks may be noticeably audible to the human ear, and are undesirable.

Returning to (A), the dashed line shows the effect of applying a randomly generated delay to each performance increase to eliminate the periodicity. As can be seen, the performance increases occur at different times relative to when they would occur if no delay were applied. Furthermore, since a different (and randomly generated) amount of delay is provided to each performance increase relative to its immediate predecessor, the performance increases occur aperiodically. The effect of this on acoustic noise is seen by the dashed line in (B), which no longer exhibits the peaks that occur along with the periodic changes. Whereas the periodic changes may produce noticeable tonal noise, the noise generated by aperiodic changes may more resemble white noise and may be less annoying to an end user.

It is noted that even though the performance level increases may be made to occur aperiodically, the processing workload increases causing these performance level changes may nevertheless continue to occur in a periodic manner. However, since the delay may be relatively small, impact on overall performance of the system may also be small.

Figure 4:
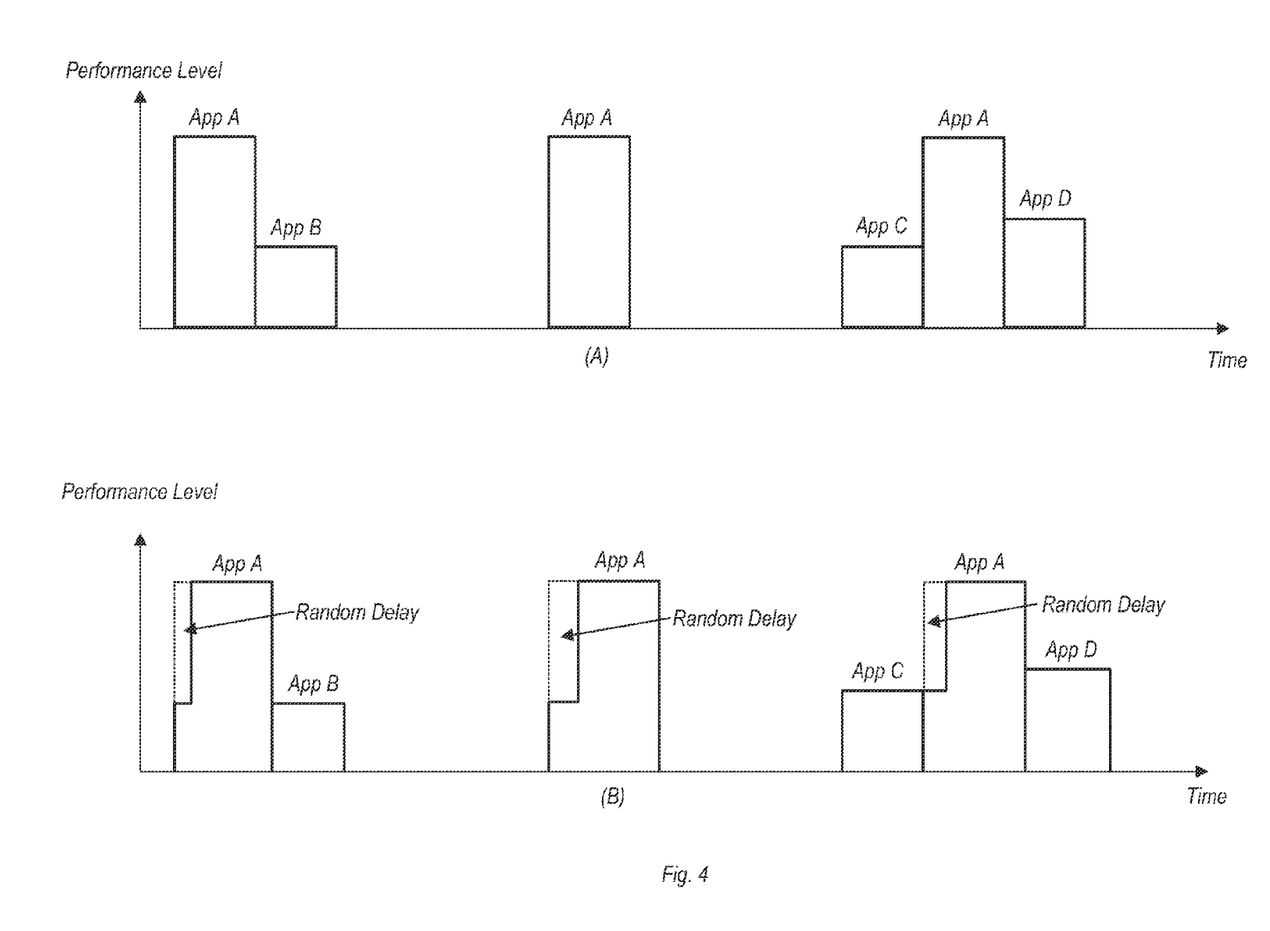
FIG. 4 is a diagram illustrating operation of one embodiment of a system in which an application causes periodic changes to a performance level and subsequently, the performance level is changed aperiodically.

FIG. 4 is a diagram illustrating operation of one embodiment of a system in which an application causes periodic changes to a performance level and subsequently, the performance level is changed aperiodically. Part (A) of the example shown in FIG. 4 illustrates one possible effect of periodic application behavior prior to detection by performance controller 17. Application A ('App A') as shown here is exhibiting periodic workloads, with idle times in between. Applications B, C, and D are also executing on the processor, although none of these applications are exhibiting periodic behavior. As a result of the periodic behavior of Application A (and more particularly, the periodic increases in workload), the processor performance level is also increased periodically. This may result in the acoustic noise discussed above.

Part (B) of FIG. 4 illustrates the post-detection scenario. Application A is still exhibiting periodic behavior, although the periodicity has been detected by performance controller 17. Thereafter, random delays are applied to the corresponding performance increases of the processor, even though the workload changes remain periodic. Each random delay may be different from the one which preceded it in order to cause the performance level increases to occur aperiodically. Applying random delays to the performance level increases may in turn reduce the acoustic noise discussed above, and in particular, may reduce or eliminate some tonal noise.

Figure 5:
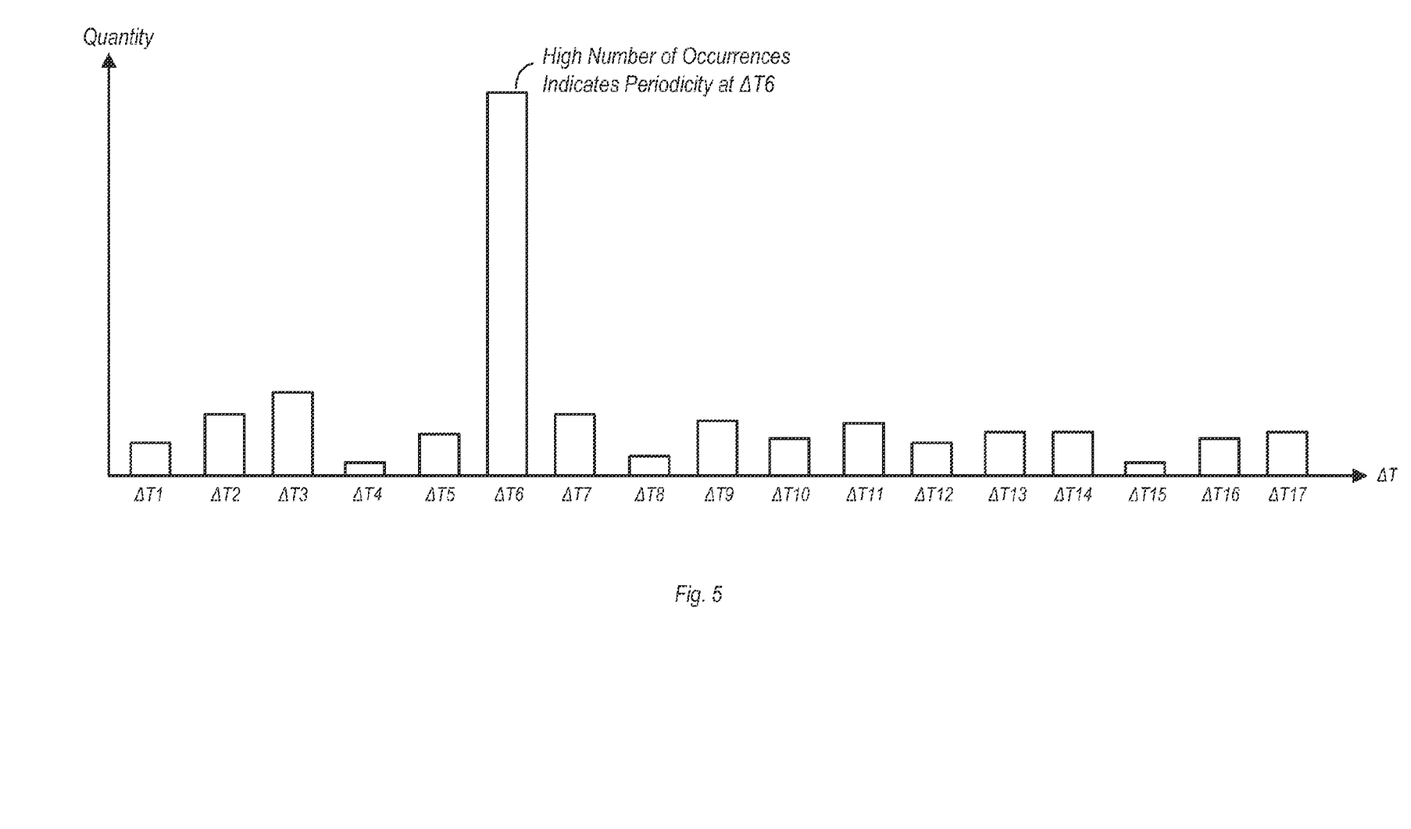
FIG. 5 is a diagram illustrating a histogram used generated and used by one embodiment of a performance monitor.

FIG. 5 is a diagram illustrating a histogram used generated and used by one embodiment of a performance monitor. The illustrated example shows a histogram that may be generated by one embodiment of a performance controller 17. As previously noted, with each occurrence of a processing workload change (e.g., increase) a time difference, or ΔT, between the time of the current increase and the most recent previous increase may be calculated. Each calculated ΔT is then added into one of a number of different bins, e.g., ΔT1, ΔT2, ΔT3, etc. It is noted that in some embodiments, the performance controller 17 may keep only the most recent ΔT values, discarding older values.

Performance controller 17 may utilize the histogram to determine if periodic workload increases are occurring. In the illustrated example, the bin of ΔT6 is showing a much greater number of workload increases relative to the other bins. This may be interpreted by performance controller 17 that periodic workload increases are occurring with a periodicity of ΔT6. The performance controller 17 may then provide an indication to power management unit 18, and may also cause random delay generator 13 to begin generating random delay values, if it is not already doing so. Thereafter, power management unit may begin applying the random delay values to vary the periodicity of the performance increases that were a result of the processing workload increases at a periodicity of ΔT6. Thus, subsequent performance increases may occur at ΔT6 ± a randomly generated delay value. As a result, the subsequent performance increases may occur aperiodically, such as in the example shown in FIG. 3.

It is noted that the histogram shown in FIG. 5 may apply to a specific application executing on processor core 14. Moreover, performance controller 17 may maintain such a histogram for each active application. In some embodiment, performance controller 17 may also maintain an aggregate histogram for all applications executing on processor core 14. This may allow performance controller 17 to monitor for any periodic behavior that might occur as result from the concurrent execution of multiple applications that might otherwise go undetected if monitoring was limited to a per-application basis. This may enable the mechanisms discussed herein to cause the aperiodic changes to performance level if periodic changes were previously caused by the combined effect of two or more applications.

In general, performance controller 17 may generate and maintain histograms of various types of data, including for specific applications (or threads, etc.), aggregate data of all applications, or various combinations thereof. Instead of tracking actual performance level increases, embodiments of performance controller 17 are also contemplated that instead track the demand for performance level increases. For example, if a particular application is periodically demanding performance level increases, performance controller 17 may generate a histogram based on this data and may continue to do so even after power management unit 18 begins causing performance levels to be increased aperiodically.

If execution of the application exhibiting periodic behavior is terminated, performance controller 17 may cause the power management unit 18 to discontinue applying of the random delays for the effect of making the corresponding performance level increases aperiodic. If the given application remains active but otherwise discontinues periodic behavior, the applying of random delay to performance level increases may be discontinued in that instance as well.

Figure 6:
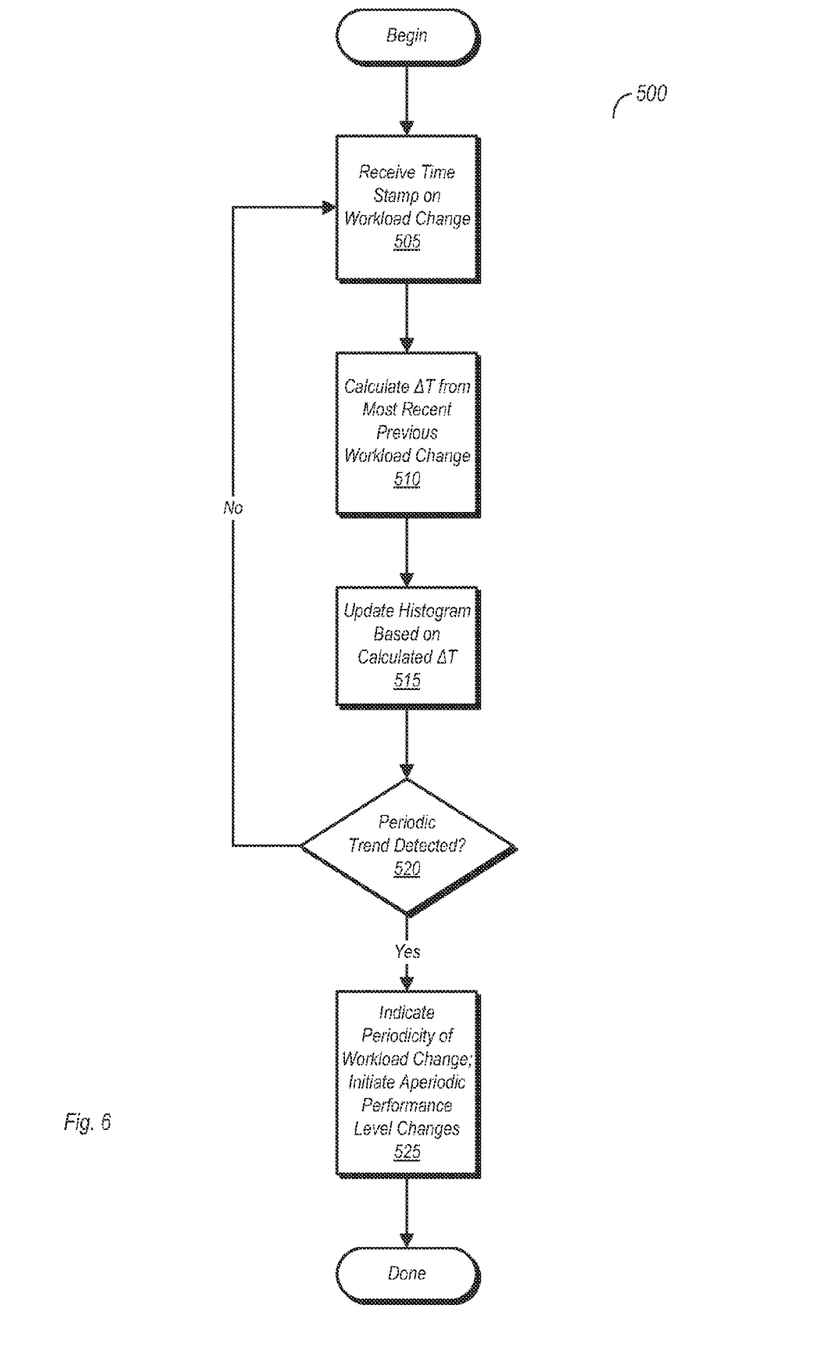
FIG. 6 is a flow diagram illustrating one embodiment of a method for determining the occurrence of periodic workload changes.

FIG. 6 is a flow diagram illustrating one embodiment of a method for determining the occurrence of periodic workload changes. Method 500 may be performed with various embodiments of the apparatus/software discussed above. Method 500 may also be performed with other hardware/software embodiments that are not discussed herein.

Method 500 begins with the occurrence of a workload change for a given application and the receipt of a time stamp indicating the time of the same (block 505). Upon receiving the time stamp, a ΔT may be calculated relative to a most recent pervious workload change for the same application (block 510). After calculating the ΔT value, at least one histogram maintained by a performance controller may be updated (block 515). If no periodic trend is detected (block 520, no), then the method returns to block 505 with the next receipt of a time stamp. If a periodic trend is detected (block 520, yes), then the periodicity of the workload is indicated to a power management unit or similar unit. Prior to detection, the periodic changes to workload may result in periodic changes to the performance level of the processor. Subsequent to detection, the power management unit or performance controller may respond by initiating aperiodic changes to the performance level (block 525).

Figure 7:
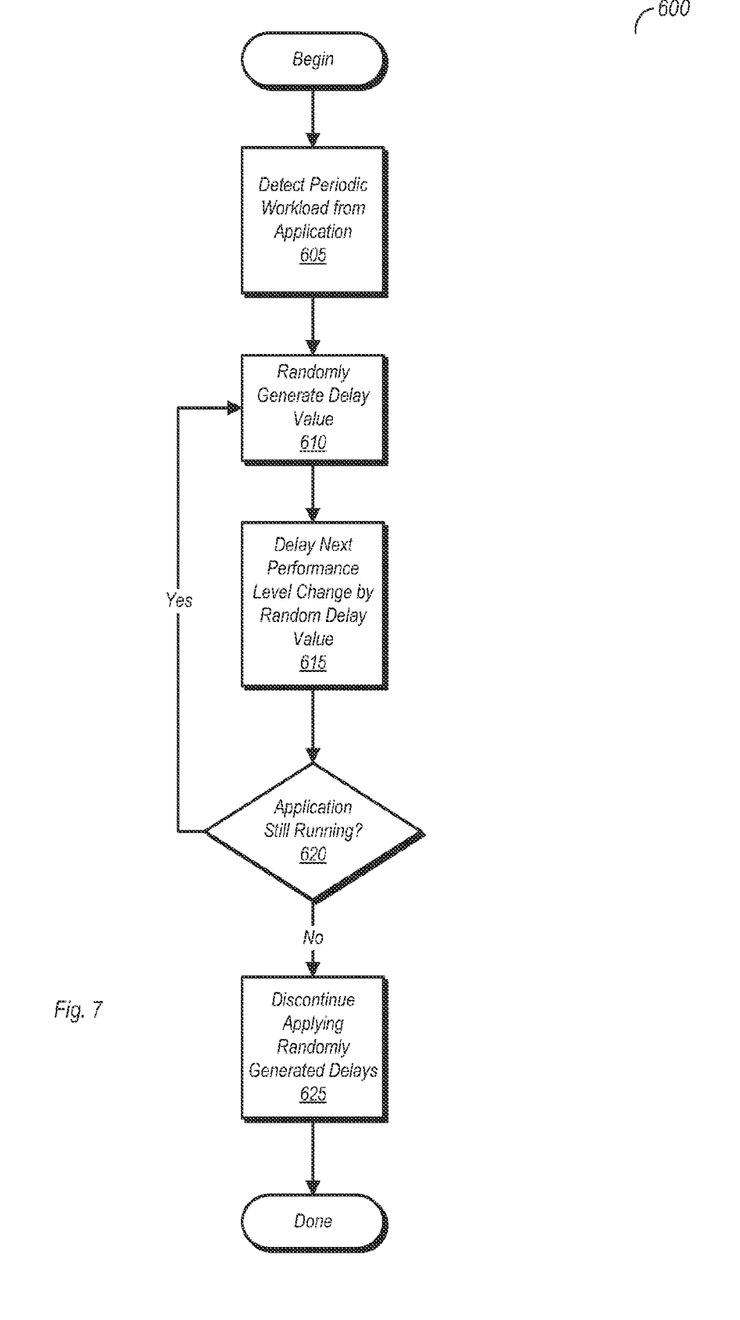
FIG. 7 is a flow diagram illustrating one embodiment of a method for causing aperiodic changes in performance levels.

FIG. 7 is a flow diagram illustrating one embodiment of a method for causing aperiodic changes in performance levels. As with method 500, method 600 may be performed with the various embodiments discussed above, and is also contemplated as being performed on embodiments not discussed herein. Additionally, it is noted that this particular embodiment of method 600 is discussed based on a particular application causing performance level increases, although it may be more generally applied to any group of instructions (e.g., thread) that cause a periodic change to a performance level of a processor or processor core.

Method 600 begins with the determination that changes of a workload for a given application are occurring periodically (block 605). Responsive thereto, delay values may begin to be randomly generated (block 610). A generated random delay value may be provided to a power or performance management block (hardware or software) that controls the performance level. The power/performance management block may apply the randomly generated delay to a next performance level change (block 615). If the application that caused performance level changes to occur periodically remains active (block 620, yes), the method may return to block 610, and the next performance level change may be delayed by another (different) delay value that is also randomly generated. Applying random delays to successive performance level changes may change their behavior from periodic to aperiodic. If the application that requested or otherwise caused performance level changes to occur periodically (i.e. prior to applying randomly generated delays to cause aperiodic changes) discontinues execution (block 620, no), then the power/performance management block may discontinue applying randomly generated delays (block 625).

Figure 8:
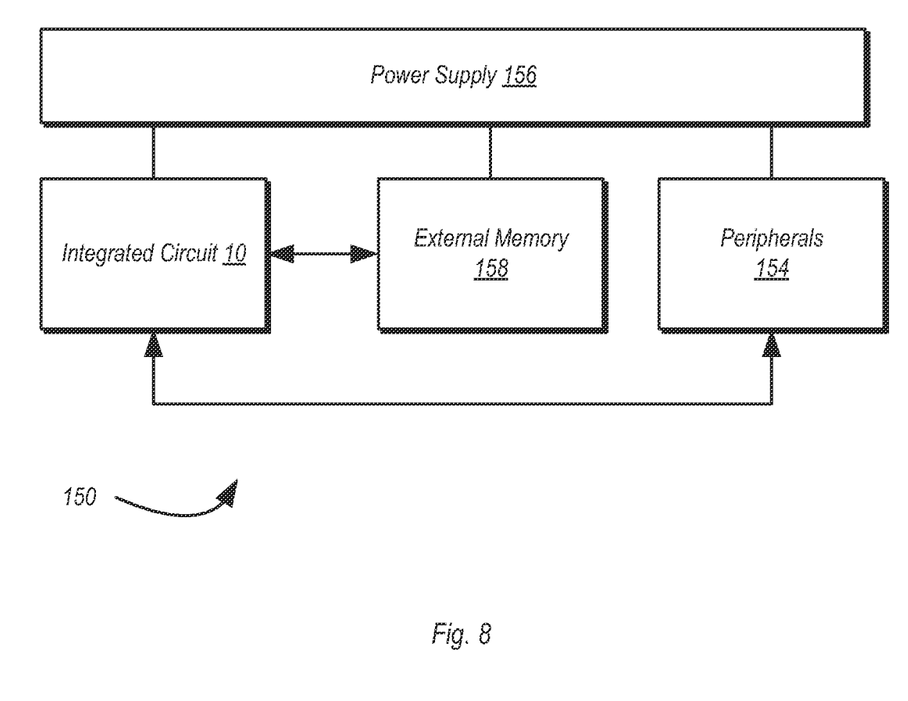
FIG. 8 is block diagram of one embodiment of an exemplary system.

Turning next to FIG. 8, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A method comprising:
   detecting periodic processing workload increases associated with a first application executing on a processor, wherein the periodic workload increases cause corresponding periodic performance level changes to the processor; and
   causing subsequent performance level changes of the processor to occur aperiodically responsive to said detecting periodic processing workload increases, wherein the aperiodic performance level increases occur while the workload increases remain periodic, wherein causing subsequent performance level changes to occur aperiodically comprises:
      randomly generating a random delay value using a random delay generator;
      delaying a next performance level change by the random delay value; and
      repeating said randomly generating and delaying for one or more additional performance level changes.

2. The method as recited in claim 1, wherein said detecting comprises a performance controller tracking performance information for the processor.

3. The method as recited in claim 2, further comprising the performance controller recording, for each instance of a periodic processing workload increase, a time stamp indicating a time at which the instance of the periodic processing workload increase occurred.

4. The method as recited in claim 3, further comprising the performance controller detecting the periodic processing workload increase based on time stamps for each of a number of processing workload increases.

5. The method as recited in claim 4, further comprising:
   the performance controller providing an indication of a power management unit responsive to said detecting the periodic processing workload increases; and
   the power management unit causing subsequent performance level corresponding to the periodic processing workload increases to occur aperiodically responsive to receiving the indication.

6. The method as recited in claim 1, further comprising concurrently executing the first application on the processor with one or more additional applications, wherein the one or more additional applications are not associated with periodic performance level increases.

7. The method as recited in claim 1, wherein the performance level changes of the processor comprise increasing at least one of a processor supply voltage and a processor clock frequency.

8. A system comprising:
a processor configured execute instructions of one or more applications;
a power management unit configured to control a performance level of the processor; and
a performance controller configured to track respective processing workloads of each of the one or more applications and further configured to detect periodic workload increases from a first application of the one or more applications;
wherein, responsive to detecting periodic workload increases, the power management unit is configured to cause subsequent performance level increases associated with the first application to occur aperiodically while the workload increases remain periodic;
wherein the system further comprises a random delay generation unit configured to generate a random delay values, wherein responsive to detecting the periodic increases, the power management unit is configured to cause performance level increases to occur aperiodically by applying a delay to one or more subsequent increases in the performance level of the processor by a random delay value received from the random delay generation unit.

9. The system as recited in claim 8, wherein the power management unit is configured to increase processor performance by increasing at least one of a processor supply voltage and a processor clock frequency.

10. The system as recited in claim 8, wherein the performance controller is configured to record a time of occurrence for increases in the respective processing workloads of each of the one or more applications.

11. The system as recited in claim 10, wherein the performance controller is configured to detect periodic processing workload increases from the first application based on determining time differences between occurrences of increases in the processing workload from the first application.

12. The system as recited in claim 8, wherein the performance controller is configured to determine which of one of one or more applications executing on the processor is causing periodic increases in the performance level of the processor responsive to detecting periodic performance level increases.

13. The system as recited in claim 8, wherein the performance controller is configured to provide an indication to the power management unit responsive to determining that the first application has discontinued execution.

14. A processor comprising:
at least one processor core configured to execute instructions of an application;
a power management unit configured to control a performance level of the processor core;
a performance monitoring unit configured to cause the power management unit to cause aperiodic increases in the performance level of the processor core responsive to determining, prior to causing the aperiodic increases, an occurrence of periodic workload increases by the application, wherein the power management unit is configured to cause performance level increases of the processor core responsive to workload increases by the application and is further configured to cause the aperiodic performance level increases while the workload increases remain periodic; and
a random delay generator configured to randomly generate delay values for performance level increases occurring subsequent to determining that the performance level of the processor was being periodically increased, wherein the power management unit is configured to cause the aperiodic increases in the performance level of the processor core by delaying a next increase in the performance level by a delay value generated by the random delay generator.

15. The processor as recited in claim 14, wherein the power management unit is configured to increase the performance level of the processor core by:
increasing a supply voltage received by the processor core;
increasing a clock frequency of a clock signal received by the processor core; or
increasing both the supply voltage and clock frequency.

16. The processor as recited in claim 14, wherein the performance monitoring unit is configured to:
record a time stamp for each occurrence of a workload increase by the application;
compute an amount of time delta since a most recent previous workload increase;
arrange time deltas between performance level increases in a histogram; and
determine whether periodic increases in the workload are occurring based on information recorded in the histogram.

* * * * *